US012794904B2

(12) United States Patent
Hulcoop et al.

(10) Patent No.: US 12,794,904 B2
(45) Date of Patent: Nov. 10, 2026

(54) PRO-ACTIVE DETECTION OF MISAPPROPRIATION OF WEBSITE SOURCE CODE

(71) Applicant: Royal Bank of Canada, Toronto (CA)

(72) Inventors: Adam Hulcoop, Whitby (CA); Gadi Shpits, East Gwillimbury (CA); Jahanrajkar Singh, Brampton (CA); Alexander Gorshkov, Aurora (CA); Mackenzie Preston, Toronto (CA); Felix Kurmish, Nepean (CA)

(73) Assignee: ROYAL BANK OF CANADA, Toronto (CA)

( * ) Notice: Subject to any disclaimer, the term of this patent is extended or adjusted under 35 U.S.C. 154(b) by 442 days.

(21) Appl. No.: 18/497,816

(22) Filed: Oct. 30, 2023

(65) Prior Publication Data

US 2024/0179159 A1 May 30, 2024

Related U.S. Application Data

(60) Provisional application No. 63/429,019, filed on Nov. 30, 2022.

(51) Int. Cl.
*H04L 9/40* (2022.01)

(52) U.S. Cl.
CPC ........ *H04L 63/1416* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 7,958,555 | B1 * | 6/2011 | Chen | H04L 63/1441 726/25 |
| 8,516,591 | B2 * | 8/2013 | Fly | H04L 9/3234 726/24 |
| 8,756,684 | B2 * | 6/2014 | Frantz | H04L 63/1408 370/242 |
| 9,009,829 | B2 * | 4/2015 | Stolfo | G06F 21/552 726/23 |
| 9,489,529 | B2 * | 11/2016 | Baker | G06F 21/56 |
| 9,961,053 | B2 * | 5/2018 | Yedidi | H04L 63/06 |
| 10,498,761 | B2 * | 12/2019 | Wright | H04L 63/168 |
| 10,581,878 | B2 * | 3/2020 | Ng | H04L 63/0281 |
| 10,645,117 | B2 * | 5/2020 | Vargas Gonzalez | H04L 63/1425 |
| 10,664,856 | B2 * | 5/2020 | Robbin | H04W 4/80 |
| 10,834,051 | B2 * | 11/2020 | McClintock | H04L 63/145 |
| 11,470,114 | B2 * | 10/2022 | Pratt | H04L 63/1416 |
| 11,483,343 | B2 * | 10/2022 | Kohavi | H04L 63/1425 |
| 11,503,072 | B2 * | 11/2022 | Akuka | H04L 63/1416 |
| 11,736,512 | B1 * | 8/2023 | Overson | H04L 63/1416 726/23 |

(Continued)

*Primary Examiner* — Backhean Tiv

(57) ABSTRACT

A method for concealing threat detection and notification code in a website code base comprises maintaining at least one beacon within the website code base. Each beacon is disguised as code for a resource request, and is adapted to transmit at least one signal identifying misappropriation of the website code base. In some embodiments, a first beacon transmits a signal identifying misappropriation of the website code base, and a second beacon transmits a signal identifying tampering with the first beacon.

26 Claims, 5 Drawing Sheets

(56) References Cited

U.S. PATENT DOCUMENTS

| | | | | |
|---|---|---|---|---|
| 11,736,521 | B2 * | 8/2023 | Tyler | G06F 16/907 726/22 |
| 12,021,894 | B2 * | 6/2024 | Clausen | H04L 63/1416 |
| 2004/0003248 | A1 * | 1/2004 | Arkhipov | H04L 9/3247 713/170 |
| 2004/0078422 | A1 * | 4/2004 | Toomey | G06F 21/6218 709/202 |
| 2006/0095955 | A1 * | 5/2006 | Vong | H04L 63/101 726/3 |
| 2009/0228780 | A1 * | 9/2009 | McGeehan | G06F 21/55 726/4 |
| 2010/0186088 | A1 * | 7/2010 | Banerjee | H04L 63/1433 709/224 |
| 2013/0097696 | A1 * | 4/2013 | Baker | G06F 21/56 726/17 |
| 2016/0191548 | A1 * | 6/2016 | Smith | G06F 21/554 726/23 |
| 2016/0241589 | A1 * | 8/2016 | Liu | H04L 63/168 |
| 2017/0063923 | A1 * | 3/2017 | Yang | G06F 21/56 |
| 2017/0346797 | A1 * | 11/2017 | Yedidi | H04L 63/14 |
| 2018/0063190 | A1 * | 3/2018 | Wright | H04L 63/1425 |
| 2020/0084225 | A1 * | 3/2020 | McKendall | G06F 21/54 |
| 2021/0006591 | A1 * | 1/2021 | Akuka | H04L 63/1416 |
| 2021/0211463 | A1 * | 7/2021 | Cleveland | H04L 63/145 |
| 2024/0179159 | A1 * | 5/2024 | Hulcoop | H04L 63/1416 |
| 2025/0141921 | A1 * | 5/2025 | He | H04L 63/1483 |

* cited by examiner

PRO-ACTIVE DETECTION OF MISAPPROPRIATION OF WEBSITE SOURCE CODE

CROSS-REFERENCE TO RELATED APPLICATION

This application claims priority to U.S. Provisional Application No. 63/429,019 filed on Nov. 30, 2022 and which is incorporated herein by reference.

TECHNICAL FIELD

The present disclosure is directed to methods, systems, and computer program products for detecting misappropriation of website source code.

BACKGROUND

The term “phishing” refers to a type of fraud used to manipulate individuals into activating a link to a malicious website. These malicious websites may impersonate the website of a legitimate merchant or financial institution to deceive the victim into entering sensitive information, such as logins, passwords, or bank account and credit card numbers.

The term “phishing” is derived from “fishing” and, like the latter, relies on “bait”. The bait may take the form of an e-mail, text message or the like purporting to be from a trusted party, such as a bank or other financial institution, or an e-commerce or entertainment platform.

In one common example, a message may purport to come from a bank or other financial institution, claiming that the person’s account has been locked, and providing a link for the person to “unlock” their account. The link will take the person to a website that is designed to mimic the financial institution’s website, with fields for the user to enter their credentials (e.g. user name and password, and possibly bank account details). In fact, the website is fraudulent, and once the user has provided their details, these are captured for use by the miscreant operators in conducting illicit transactions with the user’s account, which may be drained before the treachery is discovered. In many cases, the scoundrels use web browser features to access and copy the source code of the original website, and then use the copied source code to make their phishing website look as similar as possible to the real website.

U.S. Patent Application Publication No. 2023/0065787 A1 and its counterpart Canadian Patent Application No. 3,170,593, each entitled “Detection of Phishing Websites Using Machine Learning” and incorporated by reference herein, although not admitted to be prior art, describe one approach to detection of phishing websites. According to this approach, a trained classifier engine identifies potential phishing websites by parsing a target website into URL information and HTML information and identifying predetermined URL features and predetermined HTML features, and provides a prediction as to whether the target website is a phishing website or a legitimate website, based on the predetermined URL features and the predetermined HTML features. While this is a useful approach, like any machine learning classifier, it is not infallible. Moreover, it is to some extent reactive, as it requires identification of the target website to be fed to the classifier.

The resourcefulness of greedy, dastardly blackguards knows few bounds, and phishing messages can be highly manipulative and effective. Thus, it is an ongoing challenge to defend against phishing.

SUMMARY

In one aspect, a computer-implemented method of pro-actively detecting misappropriation of website source code comprises maintaining a first beacon embedded within the website source code. The first beacon is adapted to transmit a first signal to a monitoring server upon execution of the website source code in at least some cases of said execution, wherein the first signal identifies a domain of a host server hosting the website source code. The method further comprises monitoring, by the monitoring server, for the first signal from the first beacon, and, responsive to detecting the first signal from the first beacon, initiating a first response action.

In some embodiments, the first beacon may be adapted to determine whether the domain of the host server is unfamiliar, and transmit the first signal only if the domain of the host server is unfamiliar. In particular embodiments, the first beacon may be adapted to determine whether the domain of the host server is unfamiliar by comparing the domain of the host server to a list of familiar domains. The list of familiar domains may include at least one of a localhost domain and at least one RFC1918 compliant IP address. In some embodiments where the first beacon transmits the first signal only if the domain of the host server is unfamiliar, the first response action may be a remedial action.

In some embodiments, the first beacon may be adapted to transmit the first signal in all cases upon execution of the website source code, and the first response action may comprise determining whether the domain of the host server is unfamiliar, which may comprise comparing the domain of the host server to a list of familiar domains, which list may include at least one of a localhost domain and at least one RFC1918 compliant IP address. The first response action may further comprise, responsive to a determination that the domain of the host server is unfamiliar, initiating remediation.

In some embodiments, the method further comprises maintaining a second beacon embedded within the website source code, wherein the second beacon is adapted to detect tampering with the first beacon upon execution of the website source code, and, responsive to detecting tampering with the first beacon, transmit a second signal that identifies the domain of the host server hosting the website source code, monitoring for the second signal from the second beacon, and, responsive to detecting the second signal from the second beacon, initiating a second response action.

In some embodiments where the first beacon transmits the first signal only if the domain of the host server is unfamiliar, the first signal may further contain user credential information for identifying a compromised user.

In some embodiments, the method may further comprise maintaining credential capture code embedded within the website source code, wherein the credential capture code is adapted to capture user credentials transmitted to the host server, and, responsive to capturing the user credentials, transmit user credential information identifying the user credentials to the monitoring server. In some implementations, the credential capture code is comprised within the first beacon so that the first signal includes the user credential information, and the first beacon is adapted to determine whether the domain of the host server is unfamiliar, and transmit the first signal only if the domain of the host server is unfamiliar. In other embodiments, the credential capture code is independent of the first beacon, and the credential capture code is adapted to determine whether the domain of the host server is unfamiliar, and transmit the user credential information only if the domain of the host server is unfamiliar.

In another aspect, a method of proactively detecting misappropriation of website source code comprises maintaining Trojan misappropriation detection code embedded in the website source code. The Trojan misappropriation detection code is adapted to incorporate domain identification data for a host server hosting the website source code into a misappropriation detection request text string for a Trojan misappropriation detection resource request upon execution of the website source code in at least some cases of said execution. The domain identification data identifies a domain of the host server hosting the website source code. The method further comprises monitoring, by a monitoring server, for the first Trojan resource request, and, responsive to detecting the Trojan resource request, initiating a first response action.

In some embodiments, the resource request is an image request.

In some embodiments, the request text string further incorporates user data for a user whose browser transmitted the Trojan misappropriation detection resource request.

In some embodiments, the Trojan misappropriation detection code is adapted to determine whether the domain of the host server is unfamiliar, and transmit the Trojan misappropriation detection resource request only if the domain of the host server is unfamiliar. In particular embodiments, the Trojan misappropriation detection code is adapted to determine whether the domain of the host server is unfamiliar by comparing the domain of the host server to a list of familiar domains, which may include at least one of a localhost domain and at least one RFC1918 compliant IP address. In some embodiments where the Trojan misappropriation detection code is adapted to transmit the Trojan misappropriation detection resource request only if the domain of the host server is unfamiliar, the first response action may be a remedial action.

In some embodiments, the Trojan misappropriation detection code is adapted to transmit the Trojan misappropriation detection resource request in all cases upon execution of the website source code, and the first response action may comprise determining whether the domain of the host server is unfamiliar. In some such embodiments, the first response action may further comprise, responsive to a determination that the domain of the host server is unfamiliar, initiating remediation.

In some embodiments, the method further comprises maintaining Trojan tamper detection code embedded in the website source code. The Trojan tamper detection code is adapted to detect tampering with the Trojan misappropriation detection code upon execution of the website source code, and, responsive to detecting tampering with the Trojan misappropriation detection code, transmit a tamper detection Trojan resource request. The tamper detection Trojan resource request is adapted to incorporate the domain identification data into a tamper detection request text string for the tamper detection Trojan resource request.

The Trojan tamper detection code may be adapted to detect tampering with the Trojan misappropriation detection code by comparing a script file for the Trojan misappropriation detection code as hosted to a stored value. Comparing the script file for the Trojan misappropriation detection code to the stored value may comprise comparing a hash of the script file for the Trojan misappropriation detection code to a stored hash value.

The method may further comprise maintaining Trojan credential capture code embedded within the website source code. The Trojan credential capture code is adapted to capture user credentials transmitted to the host server, and, responsive to capturing the user credentials, transmit user credential information identifying the user credentials to the monitoring server. In some implementations of such embodiments, the Trojan credential capture code is comprised within the Trojan misappropriation detection code so that the Trojan misappropriation detection resource request includes the user credential information, and the Trojan misappropriation detection code is adapted to determine whether the domain of the host server is unfamiliar, and transmit the Trojan misappropriation detection resource request only if the domain of the host server is unfamiliar. In other implementations of such embodiments, the Trojan credential capture code is independent of the Trojan misappropriation detection code, and the Trojan credential capture code is adapted to determine whether the domain of the host server is unfamiliar, and transmit the user credential information only if the domain of the host server is unfamiliar.

In some embodiments, the Trojan credential capture code is adapted to detect a submit action, capture form field data, and incorporate at least a portion of the captured form field data into the user credential information. In other embodiments, the Trojan credential capture code is adapted to detect a submit action, capture form field data, extract information identifying the user credentials from the form field data, and incorporate the extracted information into the user credential information. In either of such embodiments, the Trojan credential capture code may be adapted to capture client browser data, and incorporate the captured client browser data into the user credential information. In either of such embodiments, the Trojan credential capture code may be adapted to apply hashing to produce hashed information and include the hashed information into the user credential information.

In yet another aspect, a method for concealing threat detection and notification code in a website code base comprises maintaining at least one beacon within the website code base, with the beacon(s) being adapted to transmit at least one signal identifying misappropriation of the website code base, and the beacon(s) being disguised as code for a resource request.

In some embodiments, the signal(s) may contain host data identifying a threat actor who has misappropriated the website code base.

In some embodiments, the signal(s) may identify compromised credentials.

In other aspects, the present disclosure is directed to a computer program product comprising a tangible computer-readable medium embodying instructions, which, when executed by at least one processor, cause the at least one processor to implement the methods described above, and to data processing system comprising at least one processor and memory coupled to the at least one processor, wherein the memory stores instructions, which, when executed by the at least one processor, cause the data processing system to implement the methods described above.

BRIEF DESCRIPTION OF THE DRAWINGS

These and other features of the invention will become more apparent from the following description in which reference is made to the appended drawings wherein.

DETAILED DESCRIPTION

Figure 1:
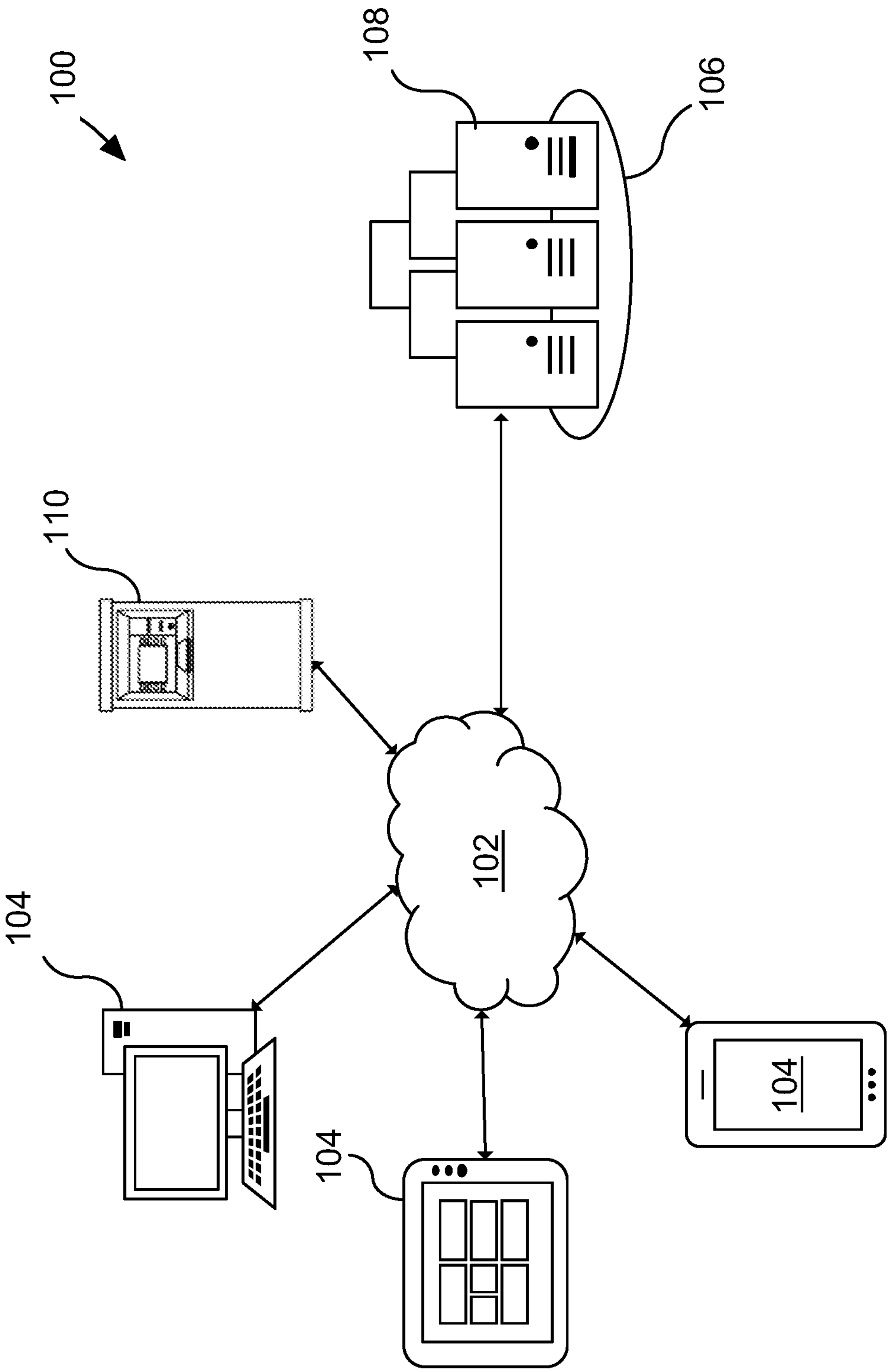
FIG. 1 shows a computer network that comprises an example embodiment of a system for detecting misappropriation of website source code.

Referring now to FIG. 1, there is shown a computer network 100 that comprises an example embodiment of a system for detecting misappropriation of website source code. More particularly, the computer network 100 comprises a wide area network 102 such as the Internet to which various client devices 104, an ATM 110, and data center 106 are communicatively coupled. The data center 106 comprises a number of servers 108 networked together to collectively perform various computing functions. For example, in the context of a financial institution such as a bank, the data center 106 may host online banking services that permit users to log in to those servers using user accounts that give them access to various computer-implemented banking services, such as bill payments and online fund transfers. Furthermore, individuals may appear in person at the ATM 110 to withdraw money from bank accounts controlled by the data center 106.

Figure 2:
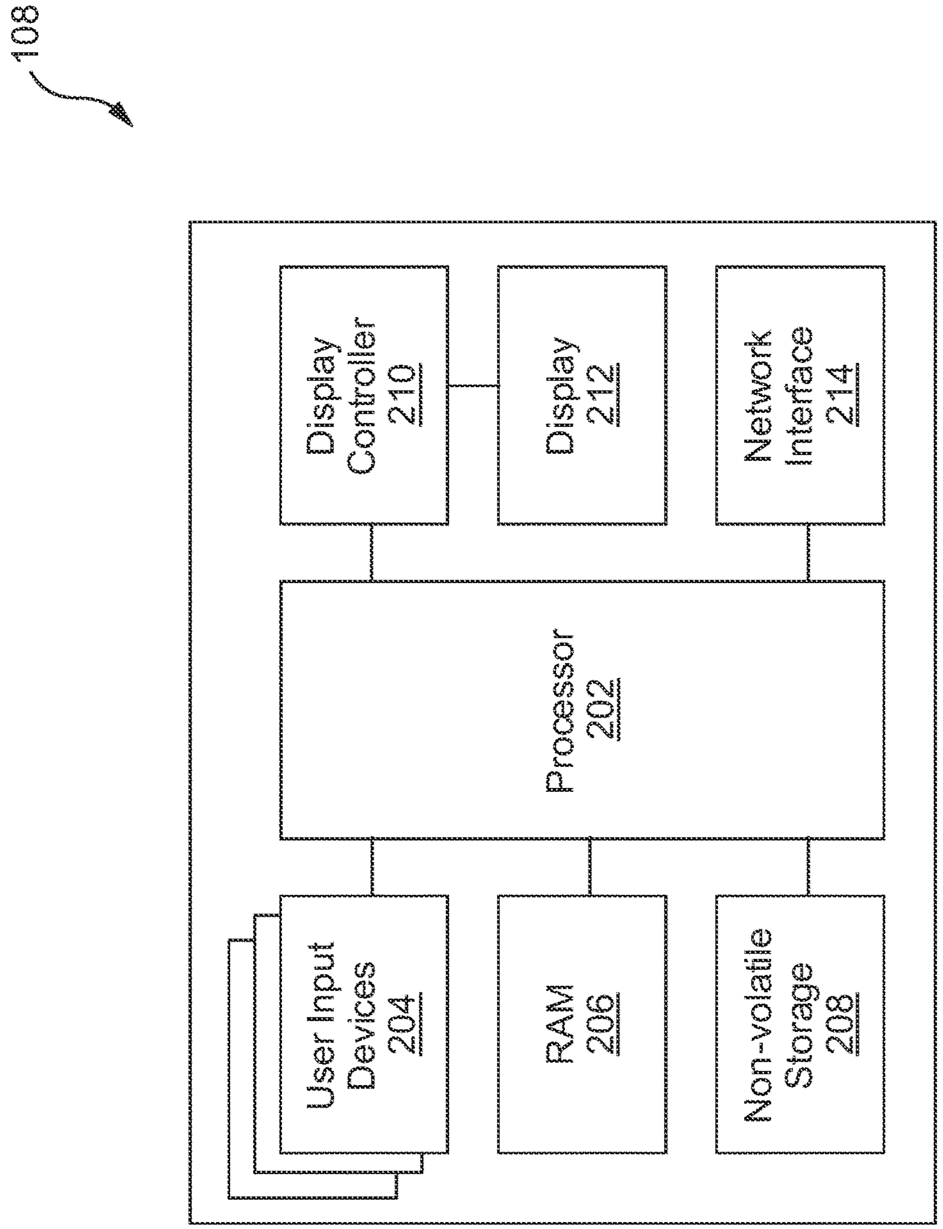
FIG. 2 depicts an example embodiment of a server in a data center.

Referring now to FIG. 2, there is depicted an example embodiment of one of the servers 108 that comprises the data center 106. The server comprises a processor 202 that controls the overall operation of the server 108. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code for execution at runtime by the processor 202; non-volatile storage 208; a display controller 210, which is communicatively coupled to and controls a display 212; and a network interface 214, which facilitates network communications with the wide area network 102 and the other servers 108 in the data center 106. The non-volatile storage 208 has stored on it computer program code that is loaded into the RAM 206 at runtime and that is executable by the processor 202. When the computer program code is executed by the processor 202, the processor 202 causes the server 108 to implement a method for identifying misappropriation of website source code such as is described in more detail in respect of FIGS. 3 to 5 below. Additionally or alternatively, the servers 108 may collectively perform that method using distributed computing. While the system depicted in FIG. 2 is described specifically in respect of one of the servers 108, analogous versions of the system may also be used for the client devices 104.

Figure 3:
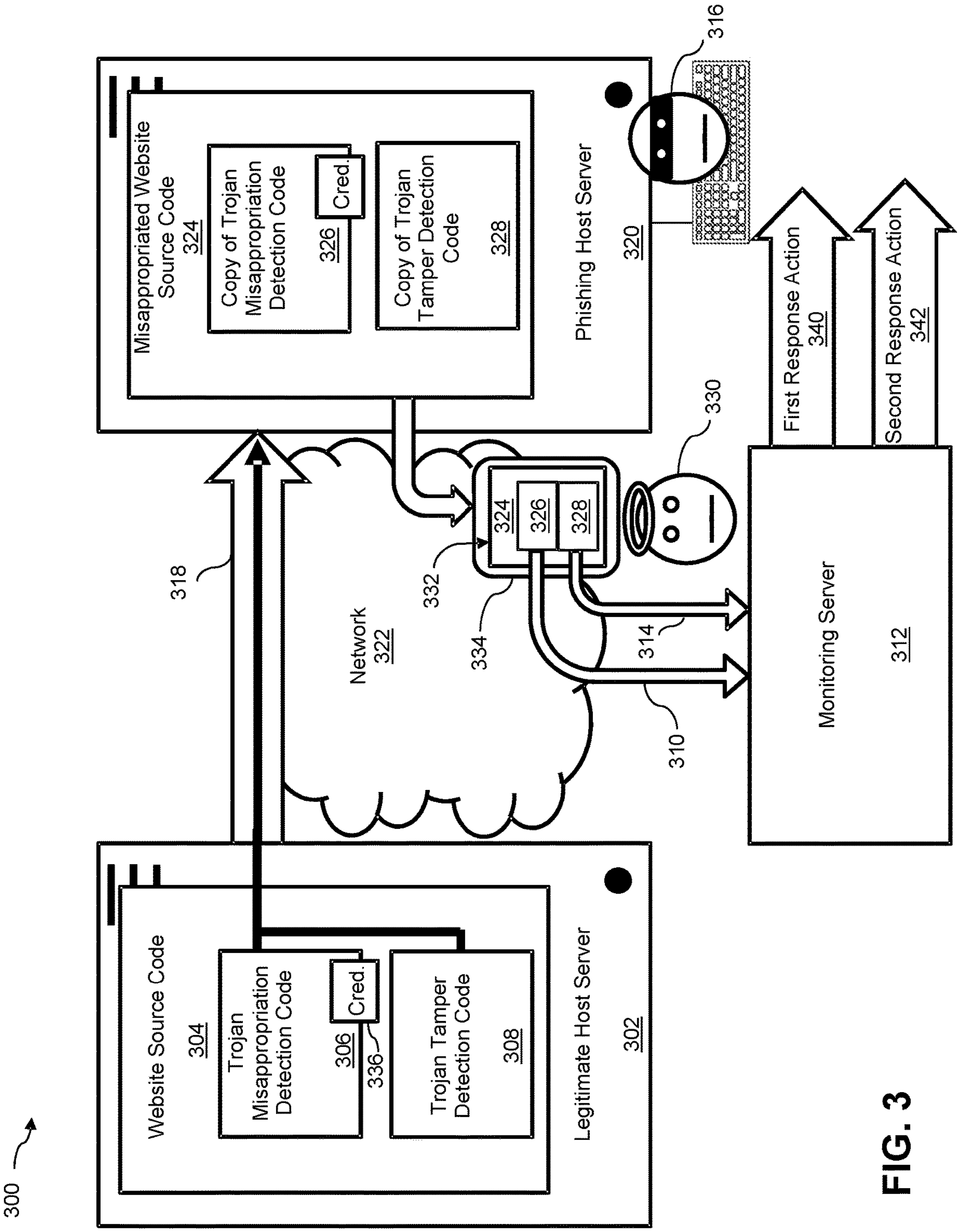
FIG. 3 shows a pictorial representation of illustrative methods of proactively detecting misappropriation of website source code.

Reference is now made to FIG. 3, which shows a pictorial representation 300 of illustrative methods of proactively detecting misappropriation of website source code.

A legitimate host server 302 (which may be one or more interconnected computer systems) hosts website source code 304, which may comprise HTML code, JavaScript code and CSS code, for example. The website source code 304 may be, for example, for online banking services that permit users to log in using user accounts that give them access to various computer-implemented banking services, such as bill payments and online fund transfers. Thus, the legitimate host server 302 may be one or more of the servers 108 shown in FIGS. 1 and 2, for example. This is merely an illustrative, non-limiting example and the website source code 304 may be for a wide range of other services, for example an online streaming service, or on online retailer, or an online auction service, among others.

The legitimate host server 302 maintains first and second beacons 306, 308 embedded within the website source code 304. The first beacon 306 is adapted to transmit a first signal 310 to a monitoring server 312 upon execution of the website source code 304, for example in a web browser 332, in at least some cases of said execution. The second beacon 308 is adapted to detect tampering with the first beacon 306 upon execution of the website source code 304, for example in the web browser 332, and, responsive to detecting tampering with the first beacon 306, transmit a second signal 314 to the monitoring server 312. Both the first signal 310 and the second signal 314, when transmitted, will identify the domain (e.g. IP address, domain name, URL) of the host server hosting the website source code 304. The monitoring server 312, which may be comprised of one or more interconnected computer systems, may be one or more of the servers 108 shown in FIGS. 1 and 2, for example. Although shown as separate components for simplicity of illustration, in operation the legitimate host server 302 and the monitoring server 312 may be the same computer system (or group of interconnected computer systems), and the legitimate host server 302 and the monitoring server 312 may comprise shared hardware, or may be hosted on different hardware from one another.

In one embodiment, the first beacon 306 comprises Trojan misappropriation detection code embedded in the website source code 304. The Trojan misappropriation detection code may comprise JavaScript code adapted to incorporate domain identification data (e.g. identifying the IP address, domain name, or URL) for a host server hosting the website source code 304 into a payload of a resource request (e.g. GET or POST); thus, the first signal 310 may take the form of a resource request. More particularly, the domain identification data may be incorporated into a misappropriation detection request text string for a Trojan misappropriation detection resource request. For example, values may be appended to a text string for the resource request. In some embodiments, certain values may be appended as query parameters; in some instances the query parameters may duplicate, reference or be derivative of information contained in the payload (which may itself be a query parameter) of the resource request so as to provide for tamper detection. In one non-limiting illustrative embodiment, a query parameter may contain a hash or checksum of a payload value. Optionally, the request text string further incorporates user data for a user whose web browser transmitted the Trojan misappropriation detection resource request. The term "Trojan", as used herein, is used in the context of the "Trojan horse" from the legendary retelling of the mythological Trojan War. According to this retelling, the Trojan horse was a hollow wooden horse concealing Greek soldiers which was accepted into the city of Troy as a gift, allowing the Greek soldiers to open the gates of the city from inside. Accordingly, the term "Trojan" as used herein refers to something which appears outwardly innocuous but conceals an adversary. Thus, the Trojan misappropriation detection code appears to be innocuous code for a resource request, but is in fact a beacon 306 that will generate a resource request that serves as a first signal 310 to identify the domain of the host server hosting the website source code 304. In preferred embodiments, the resource request is an image request; it is typical for website source code to generate numerous image requests and therefore code that generates image requests is likely to appear more innocuous than code for generating other types of resource requests; nonetheless, other types of resource requests may also be used. Moreover, in one embodiment, the image request may be a request for an image file comprised of a single pixel, making it even more inconspicuous; typically the Trojan misappropriation detection code 306 will send the image request but will not actually render the single pixel. The image request may be an image request for an image in any image format. In some embodiments, the monitoring server 312 may store an image which appears innocuous to a malefactor, and may return that image in response to an image request therefor.

Of note, the Trojan misappropriation detection code is not limited to JavaScript code adapted to incorporate domain identification data into a resource request. For example, and without limitation, the first beacon 306 may comprise Trojan misappropriation detection code that includes JavaScript code to generate a cookie that includes the relevant information. Other implementations are also contemplated.

In some embodiments, the second beacon 308 comprises Trojan tamper detection code that is adapted to detect tampering with the first beacon 306 (e.g. Trojan misappropriation detection code) during execution of the website source code 304 and, responsive to detecting such tampering with the Trojan misappropriation detection code 306, transmit a tamper detection Trojan resource request; the second signal 314 may thus be a tamper detection Trojan resource request. The Trojan tamper detection code 308 may also comprise JavaScript code. The Trojan tamper detection code 308 may be adapted to detect tampering with the Trojan misappropriation detection code 306 by comparing a script file for the Trojan misappropriation detection code 306 as hosted to a stored value. In one particular non-limiting embodiment, a hash of the script file for the Trojan misappropriation detection code 306 may be compared to a stored hash value. The Trojan tamper detection code 308 may be adapted to incorporate domain identification data for a host server hosting the website source code 304 into a resource request; thus, the second signal 314 may take the form of a resource request, with the domain identification data (and optionally user data) incorporated into a tamper detection request text string for the tamper detection Trojan resource request.

The monitoring server 312 monitors for both the first signal 310 and the second signal 314. Optionally, to provide further obfuscation, the monitoring server 312 may comprise two distinct servers, each with a different domain, with one monitoring for the first signal 310 and the other monitoring for the second signal 314. Both the legitimate host server 302 and the monitoring server 312 may be part of the data center 106 shown in FIG. 1. In some embodiments, there may be a single monitoring server 312 (or a single monitoring server 312 for each beacon 306, 308) for all of the website source code 304 that is to be monitored, even if hosted on multiple legitimate host servers 302. In other embodiments, there may be a different monitoring server 312 (or a different pair of monitoring servers 312 for respective ones of the beacons 306, 308) for each unique unit of website source code 304 (i.e. each unique website).

The monitoring server 312 is configured to decode the resource request to extract the information embodied therein, including the domain identification data. In preferred embodiments, the beacons 306, 308 may have a standardized format to facilitate information extraction by the monitoring server 312. Moreover, aspects of this standardized format may be preserved if enhancements are made to the features or information content of the beacons 306, 308 to maintain backward compatibility and limit the need to change the backend configuration on the monitoring server 312.

Consider where a malefactor 316 misappropriates 318 some or all of the website source code 304 for use in setting up a phishing website on a phishing host server 320, for example by accessing the legitimate host server 302 via a network 322, such as the Internet, and using developer functionality of a web browser to copy the website source code 304. The malefactor 316 will likely have copied the website source code 304 in order to create a phishing website for malevolent ends. Since the beacons 306, 308 are disguised as resource requests, although the misappropriated website source code 324 will have been modified from the website source code 304 to suit the purposes of the malefactor 316, the misappropriated website source code 324 will in many if not most cases still include respective copies 326, 328 of the first beacon 306 and/or the second beacon 308. When an innocent user 330 accesses the phishing website on the phishing host server 320, the misappropriated website source code 324, with the copies 326, 328 of the beacons 306, 308, will be loaded into a web browser 332 executing on the user's device 334. Upon execution of the misappropriated website source code 324 in the web browser 332, the copy 326 of the first beacon 306 will transmit the first signal 310 to the monitoring server 312, which can then initiate a first response action 340. Since the misappropriated website source code 324 is hosted by the phishing host server 320, the first signal 310 identifies the domain of the phishing host server 320, so that after decoding by the monitoring server 312, appropriate action may be taken.

In some embodiments, the first beacon 306 may be adapted to transmit the first signal 310 in all cases upon execution of the website source code 304; that is, without first attempting to determine whether the domain of the host server hosting the website source code 304 is legitimate. Thus, the first signal may also be transmitted where the website source code 304 is downloaded from the legitimate host server 302 and executed by a web browser in a user device. In an embodiment in which the first beacon 306 is adapted to transmit the first signal 310 in all cases, the first response action 340 by the monitoring server 312 comprises determining whether the domain of the host server is unfamiliar. For example, the monitoring server 312 may compare the domain of the host server to a list of familiar domains, which list may include at least one of a localhost domain (e.g. "127.0.0.1" or ":: 1") and at least one private domain, i.e. one or more RFC1918 compliant IP addresses. If the monitoring server 312 determines that domain of the host server is unfamiliar, the monitoring server 312 can initiate remediation, for example by providing an alert to security personnel, as part of the first response action 340 or as a distinct action.

Preferably, however, the first beacon 306 (and its copy 326) is adapted to determine whether the domain of the host server is unfamiliar, and to transmit the first signal 310 only if the domain of the host server is unfamiliar, which may be determined by comparison to a list of familiar domains as described above. This approach reduces the load on the monitoring server 312, since a first signal 310 will only be transmitted in a case where the host server is unfamiliar. In these embodiments, the first response action 340 may be a remedial action. There is a trade-off, however, in that where the first beacon 306 is adapted to determine whether the domain of the host server is unfamiliar, it will necessarily include additional code for doing so, and this additional code may increase the likelihood that a skilled malefactor 316 may detect the first beacon 306.

In some embodiments, in addition to identifying the domain of the host server hosting the website source code 304, the first signal 310 further contains user credential information for identifying a compromised user. A compromised user is one who has submitted information to a phishing website. For example, the user 330 may have entered his or her user name, bank card number and/or credit card number, along with a password, into form fields on an HTML page on the web browser 332 of their device 334 and that information may have been transmitted to the phishing host server 320.

In one embodiment, the legitimate host server 302 maintains Trojan credential capture code 336 embedded within the website source code 304. The Trojan credential capture code 336 is adapted to capture user credentials transmitted to the host server (e.g. phishing host server 320), and, responsive to capturing the user credentials, transmit user credential information identifying the user credentials to the monitoring server 312. In preferred embodiments, the Trojan credential capture code 336 is comprised within the first beacon 306 so that the first signal 310 includes the user credential information; in other embodiments the Trojan credential capture code may be independent of the first beacon 306. In a preferred embodiment, any error in execution of the Trojan credential capture code 336 will trigger a further resource request from the first beacon 306 to the monitoring server 312, which resource request encapsulates the URL, error code (if any) and error message (if any), for example in its payload. In other embodiments, additional error checking may be performed, with additional detected errors triggering corresponding additional resource requests. In this context, an "error" is distinguished from tampering; an "error" refers to a malfunction or unexpected event during execution of an untampered instance of the Trojan credential capture code 336.

It is preferred that a determination be made as to whether the domain of the host server is unfamiliar, and that the user credential information be transmitted only if the domain of the host server is unfamiliar. For example, in one preferred embodiment the Trojan credential capture code 336 is comprised within the first beacon 306 and the first beacon 306 is adapted to determine whether the domain of the host server is unfamiliar, and to transmit the first signal 310, including the user credential information, only if the domain of the host server is unfamiliar.

The Trojan credential capture code 336 may, for example, be adapted to detect a "submit" action in HTML (where form field data is submitted to a form-handler), capture the HTML form field data and either incorporate at least a portion of the captured form field data into the user credential information, or extract information identifying the user credentials from the form field data and incorporate the extracted information into the user credential information. Alternatively, the Trojan credential capture code 336 may be adapted to detect a change event that is triggered without a "submit" action, for example moving from one text form field to another; which may increase the likelihood of successful detection. In a preferred embodiment, the Trojan credential capture code 336 may validate some or all of the entered credentials before transmitting the resource request; for example checking that a credit card number matches a known format (e.g. no letters, correct number of digits).

The Trojan credential capture code 336 may also be adapted to capture client browser data and incorporate the captured client browser data into the user credential information. In some embodiments, the Trojan credential capture code 336 may be adapted to apply hashing to produce hashed information and include the hashed information into the user credential information. The use of hashing limits further risk to a compromised user.

Of note, in preferred embodiments the Trojan credential capture code 336 does not actually block or obstruct transmission of the user credentials as the code to implement such functionality could be more easily detected by the malefactor 316, as could the actual failure of the "submit" action or other change event; instead, the remedial action taken by the monitoring server 312 can be configured to protect the user. For example, the remedial action may include locking the user's bank account or credit card, and alerting the user, for example via a text message or a telephone call. Where automated, such remedial action can often be taken before the malefactor 316 can make nefarious use of the user credentials.

As noted above, there is a risk that the malefactor 316 may detect the first beacon 306. It is possible that if the malefactor 316 is sophisticated, the malefactor may modify the misappropriated website source code 324 to tamper with and disable the copy 326 of the first beacon 306. Should this occur, so long as the copy 328 of the second beacon 308 remains intact, execution of the misappropriated website source code 324 will cause the copy 328 of the second beacon 308 to detect the tampering with the copy 326 of the first beacon 306, and, in response, transmit the second signal 314 to the monitoring server 312, which can then initiate a second response action 342, for example by providing an alert to security personnel. Because the misappropriated website source code 324 is hosted by the phishing host server 320, the second signal 314 also identifies the domain of the phishing host server 320 so as to facilitate a suitable response.

While the embodiment in which a second beacon 308 (or copy 328 thereof) is used to detect tampering with the first beacon 306 (i.e. the copy 326 thereof) is preferred, in some embodiments the second beacon 308 may be omitted and only the first beacon 306 will be embedded in the website source code 304.

Various obfuscation techniques may be deployed to conceal the first beacon 306 and the second beacon 308 and their respective resource requests; these techniques are familiar to those of ordinary skill in the art and are not described in detail here. Timing of the respective resource requests may be configured to increase the likelihood of successful triggering of the resource request in the appropriate context while reducing the likelihood of detection.

Figure 4:
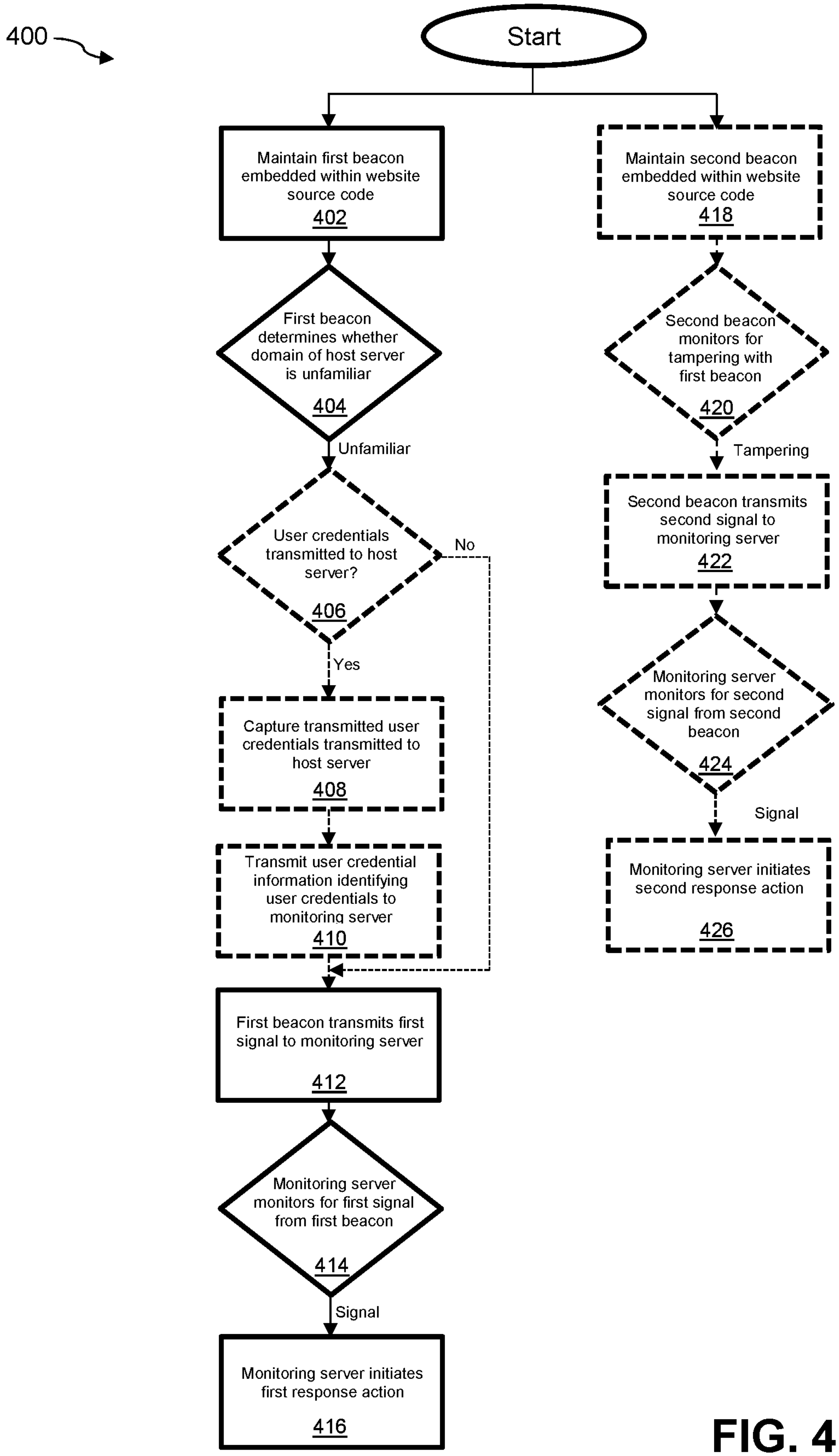
FIG. 4 is a flow chart showing a first illustrative computer-implemented method of proactively detecting misappropriation of website source code.

In yet further illustration, FIG. 4 is a flow chart showing a first illustrative computer-implemented method of proactively detecting misappropriation of website source code. At step 402, the method 400 maintains a first beacon (e.g. beacon 306) embedded within the website source code (e.g. website source code 304). At step 404, upon execution of the website source code the first beacon determines whether the domain of the host server is unfamiliar. For example, the first beacon may compare the domain of the host server to a list of familiar domains, which may include a localhost domain and/or at least one RFC1918 compliant IP address.

If the first beacon determines at step 404 that the domain of the host server is familiar, the first beacon takes no further action. Responsive to determining at step 404 that the domain of the host server is unfamiliar, the method 400 proceeds to optional steps 406 to 410.

At optional step 406, the method 400 checks whether user credentials were transmitted to the host server. If no user credentials were transmitted, the method 400 proceeds directly to step 412. If user credentials were transmitted, at step 408 the method uses credential capture code (e.g. credential capture code 336) to capture the user credentials transmitted to the host server, and at step 410, responsive to capturing the user credentials, the method 400 transmits user credential information identifying the user credentials to a monitoring server (e.g. monitoring server 312). Steps 406 to 410 may be carried out by the first beacon, and steps 406 and 408 may be combined in some embodiments.

At step 412 the first beacon transmits a first signal (e.g. first signal 310) to a monitoring server (e.g. monitoring server 312). The first signal identifies a domain of a host server hosting the website source code. In the illustrated embodiment shown in FIG. 4, the credential capture code is comprised within the first beacon so that the first signal includes the user credential information, if any. In other embodiments, the credential capture code may be embedded within the website source code apart from and independent of the first beacon. At step 414, the monitoring server monitors for the first signal from the first beacon. Responsive to detecting the first signal from the first beacon at step 414, the method 400 proceeds to step 416, where the monitoring server initiates a first response action (e.g. first response action 340), which may comprise remediation.

Steps 418 to 424 are optional, and preferably proceed in parallel with steps 402 to 416. At step 418, the method 400 maintains a second beacon (e.g. second beacon 308) embedded within the website source code. At step 420, upon execution of the website source code, the second beacon monitors for tampering with the first beacon. If the second beacon determines at step 420 that the first beacon is intact (no tampering) the second beacon takes no further action. However, responsive to detecting tampering with the first beacon at step 420, the method 400 proceeds to step 422 where the second beacon will transmit a second signal (e.g. second signal 314) that identifies the domain of the host server hosting the website source code. At step 424, the method 400 monitors for the second signal from the second beacon. Step 422 may be carried out by the same monitoring server that carries out step 414, or by a different monitoring server. Responsive to detecting the second signal from the second beacon at step 422, the method 400 proceeds to step 426, where a second response action (e.g. second response action 342) is initiated.

Figure 5:
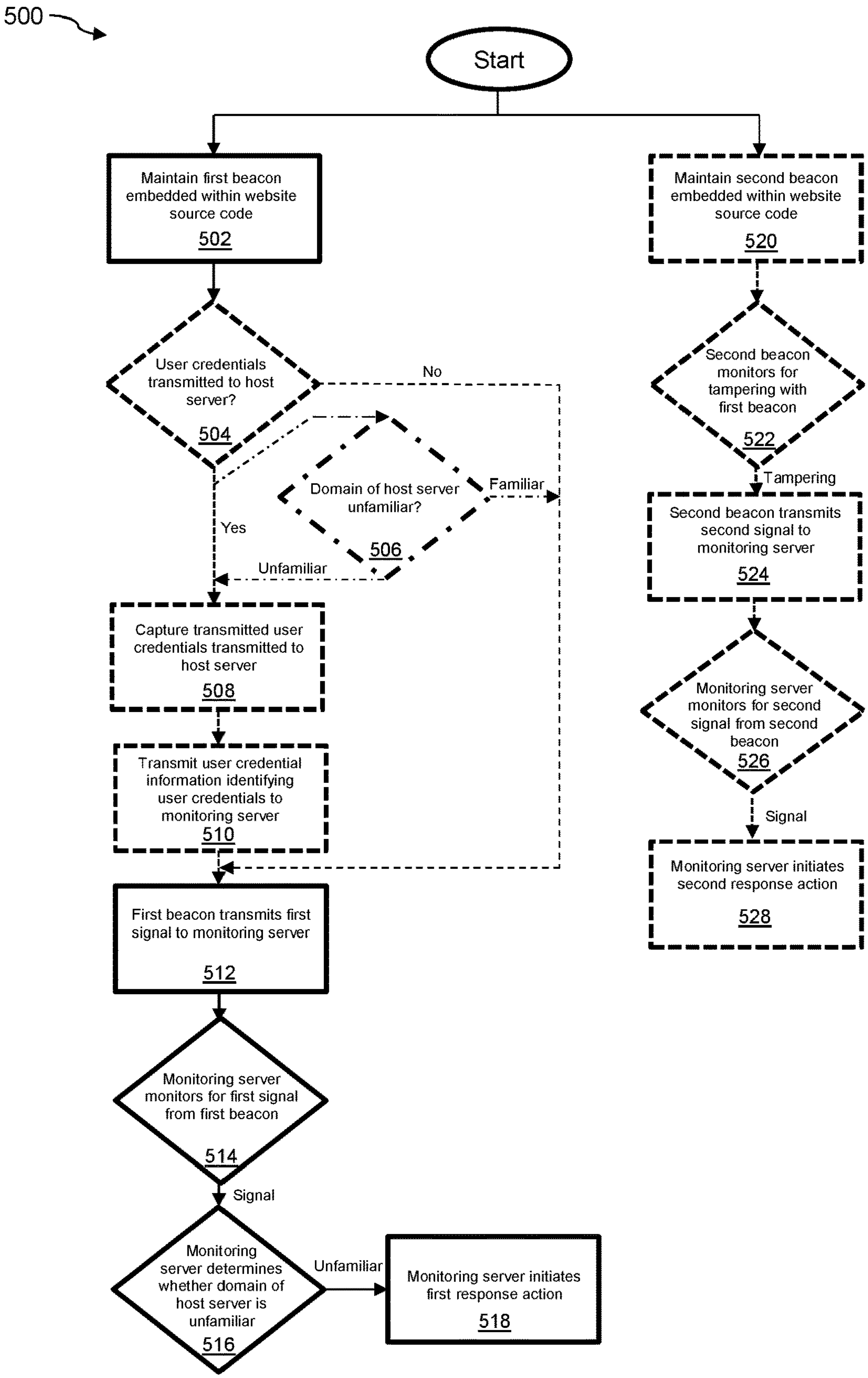
FIG. 5 is a flow chart showing a second illustrative computer-implemented method of proactively detecting misappropriation of website source code.

FIG. 5 shows another illustrative computer-implemented method 500 of proactively detecting misappropriation of website source code. At step 502, the method 500 maintains a first beacon (e.g. first beacon 306) embedded within the website source code (e.g. website source code 304). In this embodiment, the first beacon is adapted to transmit the first signal (e.g. first signal 310) in all cases upon execution of the website source code, and upon execution of the website code, the method 500 proceeds from step 502 (possibly through optional steps 504 through 510) to step 512 where the first beacon transmits the first signal to the monitoring server (e.g. monitoring server 312) in all cases of execution. One advantage of this approach, particularly where optional steps 504 through 510 are omitted, is that because the beacon does not include any code for determining whether the domain of the host server is unfamiliar, it may be more difficult for a malefactor (e.g. malefactor 316) to detect the beacon when examining the website source code.

Similar to the method 400 shown in FIG. 4, the method 500 shown in FIG. 5 also includes optional steps for handling user credentials. At step 504, credential capture code (e.g. credential capture code 336) embedded within the website source code checks whether user credentials were transmitted to the host server. If no user credentials were transmitted, the method 500 proceeds directly to step 512. In some embodiments, the credential capture code may be independent of the first beacon. Optionally in such embodiments, at step 506 the credential capture code may check whether the domain of the host server is unfamiliar, and proceed to step 508 only if the domain of the host server is unfamiliar and otherwise proceed to step 512. In other embodiments, optional step 506 may be omitted and the method 500 may (where optional steps 504 through 510 are present) proceed directly from step 504 to step 508 or 512). If user credentials were transmitted, at step 508 the credential capture code captures the user credentials that were transmitted to the host server, and at step 510, responsive to capturing the user credentials, the method 500 transmits user credential information identifying the user credentials to the monitoring server.

At step 512, the first beacon transmits the first signal to the monitoring server. As before, the first signal identifies the domain of the host server hosting the website source code. In some embodiments, the user credential information may be included in the first signal, in which case steps 510 and 512 may be combined and the first signal further contains user credential information for identifying a compromised user.

At step 514, the monitoring server monitors for the first signal from the first beacon. Responsive to detecting the first signal from the first beacon at step 514, the method 500 proceeds to step 516, where the monitoring server determines whether the domain of the host server is unfamiliar. For example, the monitoring server may compare the domain of the host server to a list of familiar domains, which may include a localhost domain and/or at least one RFC1918 compliant IP address.

If the monitoring server determines at step 516 that the domain of the host server is familiar, the first beacon takes no further action. Responsive to determining at step 516 that the domain of the host server is unfamiliar, however, the monitoring server initiates a first response action (e.g. first response action 340), which may comprise remediation, at step 518.

The method 500 shown in FIG. 5 also includes optional steps 520 to 528 for detecting tampering with the first beacon, which preferably proceed in parallel with steps 502 to 518. At step 520, the method 500 maintains a second beacon (e.g. second beacon 308) embedded within the website source code. At step 522, upon execution of the website source code, the second beacon monitors for tampering with the first beacon. If the second beacon determines at step 522 that the first beacon is intact (no tampering) the second beacon takes no further action. However, responsive to detecting tampering with the first beacon at step 522, the method 500 proceeds to step 524 where the second beacon will transmit a second signal (e.g. second signal 314) that identifies the domain of the host server hosting the website source code. At step 526, the method 500 monitors for the second signal from the second beacon. Step 524 may be carried out by the same monitoring server that carries out step 514, or by a different monitoring server. Responsive to detecting the second signal from the second beacon at step 524, the method 500 proceeds to step 528, where a second response action (e.g. second response action 342) is initiated.

As can be seen from the above description, the website misappropriation detection technology described herein represents significantly more than merely using categories to organize, store and transmit information and organizing information through mathematical correlations. The website misappropriation detection technology is in fact an improvement to Internet security technology, and therefore represents a specific solution to a computer-related problem. As such, the website misappropriation detection technology is confined to Internet security applications.

The processor(s) used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms “a”, “an”, and “the” are intended to include the plural forms as well, unless the context clearly indicates otherwise (e.g., a reference in the claims to “a training data set” or “the training data set” does not exclude embodiments in which multiple training data sets are used). It will be further understood that the terms “comprise”, “comprises” and “comprising”, when used in this specification, specify the presence of one or more stated features, integers, steps, operations, elements, and components, but do not preclude the presence or addition of one or more other features, integers, steps, operations, elements, components, and groups. Directional terms such as “top”, “bottom”, “upwards”, “downwards”, “vertically”, and “laterally” are used in the following description for the purpose of providing relative reference only, and are not intended to suggest any limitations on how any article is to be positioned during use, or to be mounted in an assembly or relative to an environment. Additionally, the term “connect” and variants of it such as “connected”, “connects”, and “connecting” as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term “and/or” as used herein in conjunction with a list means any one or more items from that list. For example, “A, B, and/or C” means “any one or more of A, B, and C”.

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

Certain illustrative embodiments have been described by way of example. It will be apparent to persons skilled in the art that a number of variations and modifications can be made without departing from the scope of the invention as defined in the claims.

What is claimed is:

1. A computer-implemented method of proactively detecting misappropriation of website source code, the method comprising:

maintaining a first beacon embedded within the website source code, wherein the first beacon is adapted to transmit a first signal to a monitoring server upon execution of the website source code, wherein the first signal identifies a domain of a host server hosting the website source code;

monitoring, by the monitoring server, for the first signal from the first beacon;

responsive to detecting the first signal from the first beacon, initiating a first response action;

maintaining a second beacon embedded within the website source code, wherein the second beacon is adapted to:

detect tampering with the first beacon upon execution of the website source code; and responsive to detecting tampering with the first beacon, transmit a second signal that identifies the domain of the host server hosting the website source code;

monitoring, by the monitoring server, for the second signal from the second beacon;

responsive to detecting the second signal from the second beacon, initiating a second response action.

2. The method of claim 1, wherein the first beacon is adapted to:

determine whether the domain of the host server is unfamiliar; and transmit the first signal only if the domain of the host server is unfamiliar.

3. The method of claim 2, wherein the first response action is a remedial action.

4. The method of claim 1, wherein the first signal further contains user credential information for identifying a compromised user.

5. The method of claim 4, further comprising:

maintaining credential capture code embedded within the website source code, wherein the credential capture code is adapted to:

capture user credentials transmitted to the host server; and responsive to capturing the user credentials, transmit user credential information identifying the user credentials to the monitoring server.

6. The method of claim 5, wherein:

the credential capture code is comprised within the first beacon so that the first signal includes the user credential information; and the first beacon is adapted to:

determine whether the domain of the host server is unfamiliar; and transmit the first signal only if the domain of the host server is unfamiliar.

7. The method of claim 1, wherein the first beacon is disguised as code for a first resource request.

8. The method of claim 7, wherein the second beacon is disguised as code for a second resource request.

9. The method of claim 1, wherein the first signal contains host data identifying a threat actor who has misappropriated the website code base.

10. The method of claim 1, wherein the first signal identifies compromised credentials.

11. A computer program product comprising a tangible, non-transitory computer-readable medium embodying instructions which, when executed by at least one processor of a data processing system, cause the data processing system to implement the method of claim 1.

12. A data processing system comprising at least one processor and memory containing instructions which, when executed by the at least one processor, cause the data processing system to implement the method of claim 1.

13. A method of proactively detecting misappropriation of website source code, the method comprising:

maintaining Trojan misappropriation detection code embedded in the website source code, wherein the Trojan misappropriation detection code is adapted to incorporate domain identification data for a host server hosting the website source code into a misappropriation detection request text string for a Trojan misappropriation detection resource request upon execution of the website source code;

wherein the domain identification data identifies a domain of the host server hosting the website source code;

monitoring, by a monitoring server, for the Trojan misappropriation detection resource request; and responsive to detecting the Trojan misappropriation detection resource request, initiating a first response action;

maintaining Trojan tamper detection code embedded in the website source code, wherein the Trojan tamper detection code is adapted to:

detect tampering with the Trojan misappropriation detection code upon execution of the website source code; and responsive to detecting tampering with the Trojan misappropriation detection code, transmit a tamper detection Trojan resource request, wherein the tamper detection Trojan resource request is adapted to incorporate the domain identification data into a tamper detection request text string for the tamper detection Trojan resource request.

14. The method of claim 13, wherein the Trojan misappropriation detection resource request is an image request.

15. The method of claim 13, wherein the misappropriation detection request text string further incorporates user data for a user whose browser transmitted the Trojan misappropriation detection resource request.

16. The method of claim 13, wherein the Trojan misappropriation detection code is adapted to:

determine whether the domain of the host server is unfamiliar; and transmit the Trojan misappropriation detection resource request only if the domain of the host server is unfamiliar.

17. The method of claim 16, wherein the first response action is a remedial action.

18. The method of claim 13, further comprising:

monitoring, by the monitoring server, for the tamper detection Trojan resource request; and responsive to detecting the tamper detection Trojan resource request, initiating a second response action.

19. The method of claim 13, wherein the Trojan tamper detection code is adapted to detect tampering with the Trojan misappropriation detection code by comparing a script file for the Trojan misappropriation detection code as hosted to a stored value.

20. The method of claim 19, wherein comparing the script file for the Trojan misappropriation detection code to the stored value comprises comparing a hash of the script file for the Trojan misappropriation detection code to a stored hash value.

21. The method of claim 13, further comprising:

maintaining Trojan credential capture code embedded within the website source code, wherein the Trojan credential capture code is adapted to:

capture user credentials transmitted to the host server; and responsive to capturing the user credentials, transmit user credential information identifying the user credentials to the monitoring server.

22. The method of claim 21, wherein:

the Trojan credential capture code is comprised within the Trojan misappropriation detection code so that the Trojan misappropriation detection resource request includes the user credential information; and the Trojan misappropriation detection code is adapted to:

determine whether the domain of the host server is unfamiliar; and transmit the Trojan misappropriation detection resource request only if the domain of the host server is unfamiliar.

23. The method of claim 21, wherein the Trojan credential capture code is adapted to:

capture client browser data; and
incorporate the captured client browser data into the user credential information.

24. The method of claim 21, wherein the Trojan credential capture code is adapted to apply hashing to produce hashed information and include the hashed information into the user credential information.

25. A computer program product comprising a tangible, non-transitory computer-readable medium embodying instructions which, when executed by at least one processor of a data processing system, cause the data processing system to implement the method of claim 13.

26. A data processing system comprising at least one processor and memory containing instructions which, when executed by the at least one processor, cause the data processing system to implement the method of claim 13.

* * * * *